United States Patent
Zhang et al.

(10) Patent No.: US 10,757,602 B2
(45) Date of Patent: Aug. 25, 2020

(54) CONNECTION HISTORY-BASED RETRY THROTTLING

(71) Applicant: FORD GLOBAL TECHNOLOGIES, LLC, Dearborn, MI (US)

(72) Inventors: Jixin Zhang, Nepean (CA); Shu-Lin Chen, Kanata (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/213,460

(22) Filed: Dec. 7, 2018

(65) Prior Publication Data
US 2020/0187038 A1  Jun. 11, 2020

(51) Int. Cl.
*H04W 4/18* (2009.01)
*H04W 28/02* (2009.01)
*H04W 4/44* (2018.01)
*H04W 4/021* (2018.01)

(52) U.S. Cl.
CPC ....... *H04W 28/0226* (2013.01); *H04W 4/021* (2013.01); *H04W 4/44* (2018.02); *H04W 28/0289* (2013.01)

(58) Field of Classification Search
CPC ............. H04W 28/0226; H04W 4/021; H04W 28/0289; H04W 4/44
See application file for complete search history.

(56) References Cited

U.S. PATENT DOCUMENTS

| | | | |
|---|---|---|---|
| 8,135,413 B2 | 3/2012 | Dupray | |
| 8,699,323 B2* | 4/2014 | Zhao | H04W 76/18 370/216 |
| 8,781,442 B1 | 7/2014 | Link, II | |
| 9,380,630 B2 | 6/2016 | Youtz et al. | |
| 9,386,484 B2 | 7/2016 | Jeong et al. | |
| 9,716,762 B2 | 7/2017 | Petersen et al. | |
| 9,918,264 B1 | 3/2018 | Bitra et al. | |
| 10,249,109 B1 | 4/2019 | Konrardy et al. | |
| 10,412,633 B1* | 9/2019 | Kotecha | H04L 47/29 |
| 2006/0183472 A1* | 8/2006 | Nookala | H04L 63/08 455/426.1 |
| 2006/0209798 A1 | 9/2006 | Oikarinen et al. | |
| 2006/0268916 A1 | 11/2006 | Sarkar | |
| 2008/0205413 A1 | 8/2008 | Pumadi et al. | |
| 2009/0135731 A1* | 5/2009 | Secades | H04W 24/10 370/252 |
| 2010/0202368 A1 | 8/2010 | Hans | |
| 2010/0272025 A1 | 10/2010 | Yu | |
| 2011/0110302 A1 | 5/2011 | Faurie et al. | |
| 2011/0242975 A1* | 10/2011 | Zhao | H04L 29/12216 370/230 |
| 2013/0133041 A1* | 5/2013 | Magyar | H04L 67/322 726/4 |
| 2013/0235719 A1* | 9/2013 | Ekici | H04W 28/0289 370/229 |

(Continued)

*Primary Examiner* — Jay P Patel
(74) *Attorney, Agent, or Firm* — Michael J. Spenner; Brooks Kushman P.C.

(57) ABSTRACT

A telematics controller is programmed to identify a location responsive to detecting a failed data call from a vehicle, and if the location is within a geographic boundary of a failure zone within a cellular tower region and a cause of the failure matches a recorded cause for the failure zone, initiate data throttling until the vehicle moved outside of the geographic boundary.

27 Claims, 4 Drawing Sheets

(56) References Cited

U.S. PATENT DOCUMENTS

| | | | |
|---|---|---|---|
| 2013/0337769 A1* | 12/2013 | Bhatia | H04L 41/5022 |
| | | | 455/406 |
| 2014/0022900 A1* | 1/2014 | Salot | H04W 28/0205 |
| | | | 370/235 |
| 2015/0117204 A1* | 4/2015 | Lott | H04L 45/306 |
| | | | 370/235 |
| 2015/0117406 A1 | 4/2015 | Kim et al. | |
| 2016/0044531 A1* | 2/2016 | Papa | H04W 28/0247 |
| | | | 370/230 |
| 2016/0248916 A1* | 8/2016 | Payne, III | H04M 15/725 |
| 2016/0330279 A1* | 11/2016 | Patel | G06F 16/2358 |
| 2016/0330655 A1 | 11/2016 | Vashi et al. | |
| 2016/0337957 A1* | 11/2016 | Gonsalves | H04L 43/16 |
| 2016/0366619 A1 | 12/2016 | Yang et al. | |
| 2017/0158213 A1* | 6/2017 | Mathews | B61L 25/02 |
| 2017/0238129 A1 | 8/2017 | Maier et al. | |
| 2017/0238278 A1* | 8/2017 | Yadav | H04W 28/0289 |
| | | | 370/329 |
| 2017/0303181 A1 | 10/2017 | Gupta et al. | |
| 2018/0176209 A1 | 6/2018 | Narayanan et al. | |
| 2018/0217613 A1 | 8/2018 | Jiang et al. | |
| 2018/0227882 A1 | 8/2018 | Freda et al. | |
| 2019/0041227 A1* | 2/2019 | Shetty | G05D 1/0285 |
| 2019/0124124 A1 | 4/2019 | Chong et al. | |
| 2019/0138934 A1* | 5/2019 | Prakash | G06N 20/00 |
| 2019/0182789 A1 | 6/2019 | Kim et al. | |

* cited by examiner

CONNECTION HISTORY-BASED RETRY THROTTLING

TECHNICAL FIELD

Aspects of the disclosure generally relate to connection history-based retry throttling.

BACKGROUND

When a data connection fails, user equipment may attempt to retry the connection. However, in many cases the connection may again fail for the same reason that the initial connection attempt failed. Retry throttling techniques may be used to throttle back retry attempts when a large percentage of requests are failing and retries are unsuccessful.

SUMMARY

In one or more illustrative examples, a vehicle includes a telematics controller programmed to identify a location responsive to detecting a failed data call from the vehicle, and if the location is within a geographic boundary of a failure zone within a cellular tower region and a cause of the failure matches a recorded cause for the failure zone, initiate data throttling until the vehicle moves outside of the geographic boundary.

In one or more illustrative examples, a method includes initiating data throttling for data calls from a vehicle responsive to a failure of a data call from the vehicle occurring within a geographic boundary of a failure zone within a cellular tower region and for a failure cause consistent with a clause specified by the failure zone; and terminating the data throttling responsive to the vehicle exiting the geographic boundary.

In one or more illustrative examples, a non-transitory computer-readable medium comprising instructions that, when executed by a processor of a telematics controller of a vehicle, cause the controller to initiate data throttling for data calls from a vehicle responsive to a failure of a data call from the vehicle occurring within a geographic boundary of a failure zone within a cellular tower region and for a failure cause consistent with a clause specified by the failure zone; and terminate the data throttling responsive to the vehicle exiting the geographic boundary.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A mobile device, such as a smart phone or a telematics control unit (TCU) of a connected vehicle, acts as a node in a network. The mobile device usually requires packet switched (PS) data connectivity over a cellular network. Due to the dynamic nature caused by environmental interference, wireless communications are inherently unreliable. Accordingly, a connection of the mobile device to the network might be dropped or rejected by the network for a variety of reasons.

To maximize data connectivity, mobile devices perform a data retry mechanism to re-establish the data connection. However, it is found that at certain spots in cellular networks, such as within underground parking, marginal coverage, or deep fade areas, the data call retries are frequently rejected and further attempts have an extremely low probability of success. Therefore, a generic retry algorithm regardless of network conditions could trigger many unnecessary attempts that drain battery power and overwhelm the network.

To address these issues, a connection-history-based retry throttling approach may be used. The approach may optimize the data retry algorithm based on past experience of data connection attempts of the device. To do so, the system may identify geographic areas that frequently fail the data call, calculate a failure rate for the area, and build a list of failure zones in which retries may be less aggressively performed to reduce ineffective data retries by the mobile device.

Figure 1:
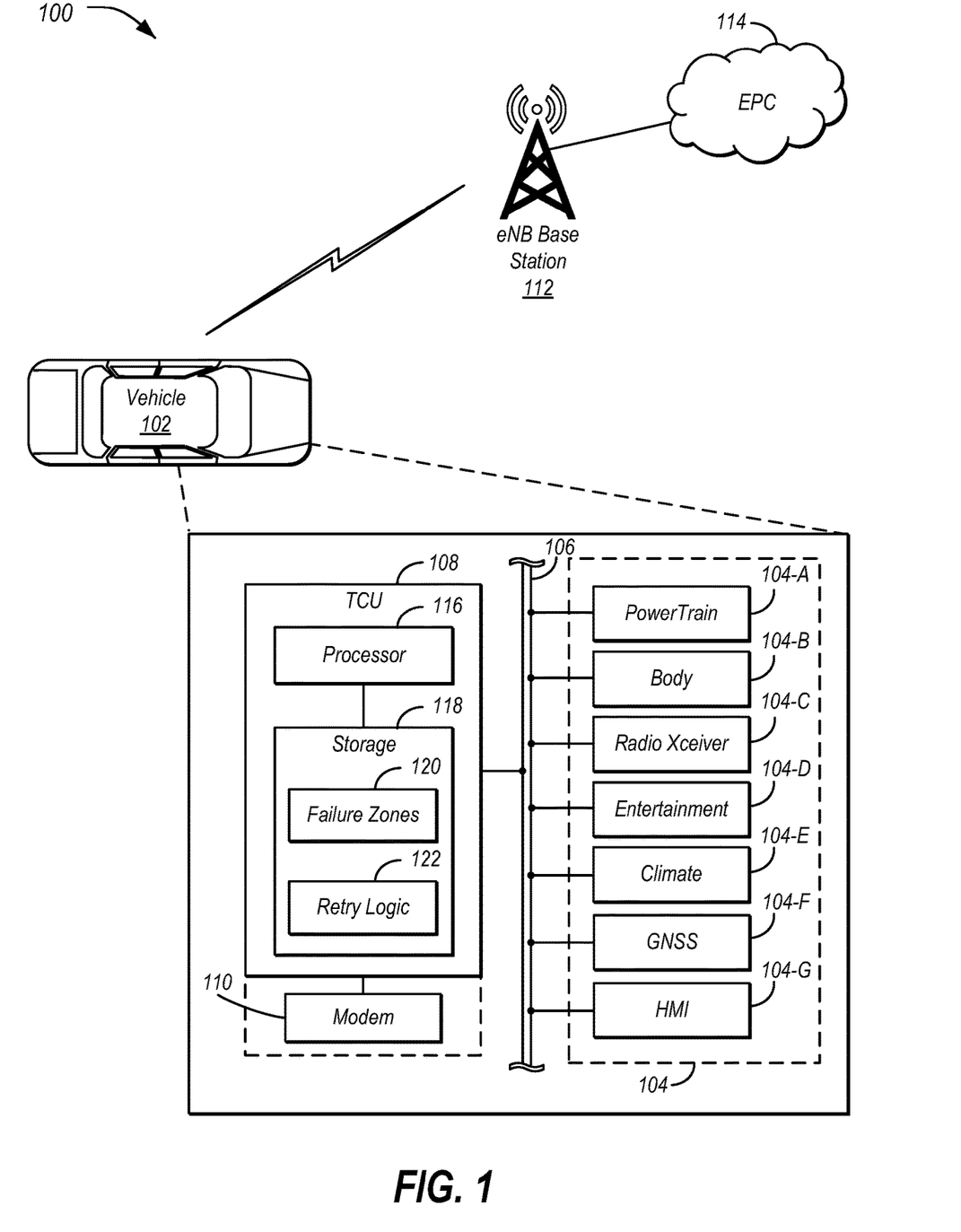
FIG. 1 illustrates an example system including a vehicle configured for performing connection history-based retry throttling.

FIG. 1 illustrates an example system 100 including a vehicle 102 configured for performing connection history-based retry throttling. As illustrated, the vehicle 102 includes a plurality of vehicle controllers 104 in communication over one or more vehicle buses 106. The vehicle 102 further includes a telematics control unit (TCU) 108 configured to send and receive data to networked devices connected to a network 114. The TCU 108 may use the failure zones 120 to inform the retry logic 122 how to perform throttling actions when the vehicle 102 is located within an identified failure zone 120. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors, and/or trunk of the vehicle 102); a radio transceiver controller 104-C may be configured to communicate with key fobs, mobile devices, or other local vehicle 102 devices; an entertainment controller 104-D may be configured to support voice command and wired or wireless interfaces such as BLUETOOTH or Wi-Fi with the driver and driver carry-on devices; a climate control management controller 104-E may be configured to provide control of heating and cooling system components (e.g., compressor clutch, blower fan, temperature sensors, etc.); a global navigation satellite system (GNSS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle controllers 104, as well as between the TCU 108 and the vehicle controllers 104. As some non-limiting examples, the vehicle bus 106 may include one or more of a vehicle controller area network (CAN), an Ethernet network, or a media-oriented system transfer (MOST) network. Further aspects of the layout and number of vehicle buses 106 are discussed in further detail below.

The TCU 108 may include network hardware configured to facilitate connectivity between the vehicle controllers 104 and devices connected to an outside network (e.g., network 114). To do so, the TCU 108 may include or otherwise access a cellular modem 110. (E.g., in some cases the modem 110 is internal to the TCU 108 while in other cases the modem 110 is external to the TCU 108.) As shown, a portion of a LTE network architecture is illustrated which may be referred to as an Evolved Packet System (EPS). The EPS may include an Evolved UMTS Terrestrial Radio Access Network (E-UTRAN), an Evolved Packet Core (EPC) network 114, a Home Subscriber Server (HSS), or an Operator's IP Services. The EPS can interconnect with other access networks. It should be noted that LTE is only an example, and the described systems are not limited to the use of LTE. These concepts are applicable to other radio access technologies, such as 3G and 5G technologies.

The E-UTRAN includes an evolved Node B (eNB) 112 which may be an example of a serving base station that serves the modem 110. The E-UTRAN also includes other eNBs 112 (not shown). The eNB 112 can provide user and control planes protocol terminations toward the modem 110. The eNB 112 may be connected to the other eNBs 112 via a backhaul (e.g., an X2 interface). The eNB 112 and other eNBs 112 may also be referred to as a base station, a base transceiver station, a radio base station, a radio transceiver, a transceiver function, a basic service set (BSS), an extended service set (ESS), or some other suitable terminology. The eNB 112 can provide an access point to the EPC network 114 for the modem 110. The modem 110 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an user equipment, a mobile terminal, a wireless terminal, a remote terminal, a handset, a user agent, a mobile client, a client, or some other suitable terminology.

The eNB base station 112 is connected by an S1 interface to the EPC network 114. The EPC network 114 includes elements such as a Mobility Management Entity (MME), other MMEs, a Serving, and a Packet Data Network (PDN) Gateway. The MME is the control node that processes the signaling between the modem 110 and the EPC network 114. Generally, the MME provides bearer and connection management. All user IP packets can be transferred through the Serving Gateway, which itself is connected to the PDN Gateway. The PDN Gateway can provide UE IP address allocation as well as other functions. The PDN Gateway is connected to the Operator's IP Services. The Operator's IP Services may include the Internet, an intranet, an IP Multimedia Subsystem (IMS), and a PS Streaming Service (PSS).

The TCU 108 may further include various types of computing apparatus in support of performance of the functions of the TCU 108 described herein. In an example, the TCU 108 may include one or more processors 116 configured to execute computer instructions, and a storage 118 medium on which the computer-executable instructions and/or data may be maintained. A computer-readable storage medium (also referred to as a processor-readable medium or storage 118) includes any non-transitory (e.g., tangible) medium that participates in providing data (e.g., instructions) that may be read by a computer (e.g., by the processor (s)). In general, the processor 116 receives instructions and/or data, e.g., from the storage 118, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of vehicle location data and/or other vehicle information from the vehicle controllers 104 connected to the one or more vehicle buses 106.

The storage 118 may be configured to store failure zones 120 data. Each failure zone 120 may indicate a geographic region in which the TCU 108 may have difficulty in communicating with the base stations 112, as well as an error code or other reason that is encountered by the TCU 108 when attempting to access the network 114 from within the geographic region of the failure zone 120. In an example, the geographic boundary of a failure zone 120 may be defined as a location point of a failure with a distance bound surrounding that point.

The retry logic 122 may be an application included on the storage 118 of the TCU 108. The retry logic 122 may include instructions that, when executed by the processor 116 of the TCU 108 allow the vehicle 102 to set up and communicate data via the EPC 114. In an example, this communication may include use of the Uu interface to communicate with the LTE eNB base station 112. The TCU 108 may be configured to identify and maintain the failure zone 120 data, as well as use retry logic 122 to perform throttling operations responsive to the vehicle 102 being located within an identified failure zone 120. Further aspects of the functionality of the retry logic 122 are described with respect to FIGS. 2-5.

Figure 2:
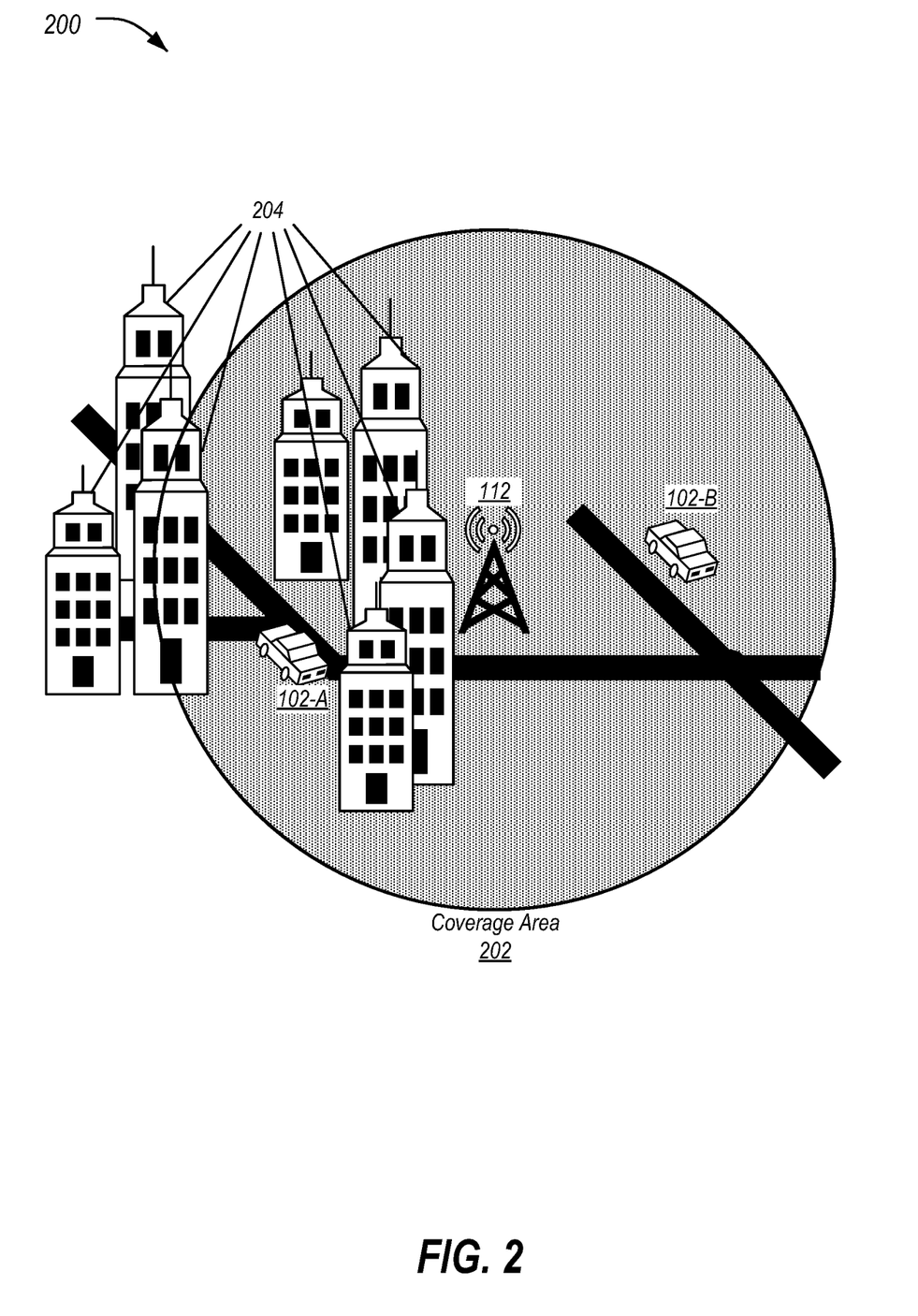
FIG. 2 illustrates an example of an environment surrounding a base station.

FIG. 2 illustrates an example of an environment 200 surrounding a base station 112. Notably, the environment 200 surrounding the base station 112 includes a coverage area 202 having high buildings 204 that obstruct line-of-sight view of the base station 112 to a vehicle 102 at a location A, as well as a flat area with good visibility of the base station 112 to the vehicle 102 at a location B. Thus, the vehicle 102 at location A may have call quality issues with the base station 112, while the same vehicle 102 at location B may have relatively few issues, despite the vehicle 102 being served by the same base station 112 for the two locations. Accordingly, a retry policy that is keyed to base station 112 may lack sufficient precision to determine whether retry throttling should be required for a vehicle 102.

Figure 3:
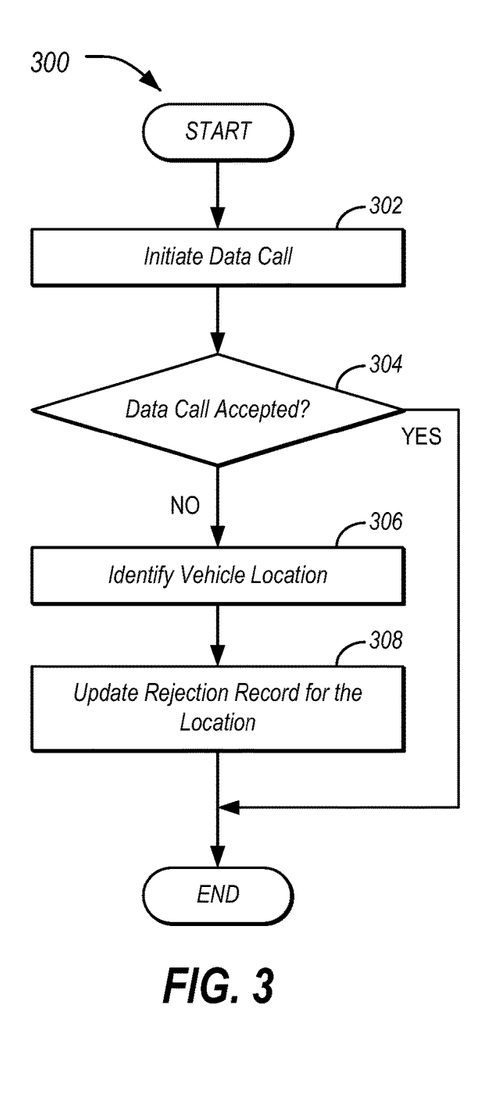
FIG. 3 illustrates an example process for identifying failure zones.

FIG. 3 illustrates an example process 300 for identifying failure zones 120. In an example, the process 300 may be performed by the TCU 108 of the vehicle 102. However, it should be noted that similar processes 300 may be performed by other mobile devices beyond the in-vehicle context.

At operation 302, the TCU 108 initiates a data call. In an example, when starting the data call, the TCU 108 sends an ACTIVATE EPS BEARER CONTEXT REQUEST message over the 4G network 114. This request can either be accepted by the wireless network 114 or fail (e.g., be rejected or time out).

At 304, the TCU 108 identifies whether the data call was accepted. In the case of rejection, cause information is provided in a response message from the network 114 to indicate the reason of failure. If the data call was accepted, the process 300 ends. Otherwise, the process continues to operation 306.

The TCU 108 identifies a location of the vehicle 102 at 306. In an example, the TCU 108 may retrieve a current location of the vehicle 102 over the vehicle bus 106 from the GNSS controller 104-F.

At 308, the TCU 108 updates a rejection record for the location. In an example, responsive to receiving a first rejection from the network 114 for a geographic location, the TCU 108 may create a record which includes the GNSS base location identified at operation 306, the reject cause identified at operation 304, and the number of success/failure data calls for the location. The TCU 108 may continue collecting these rejection records to generate a failure zone 120, which is defined as being a collection of records that have short range geographic distance D from one another. Additionally, a timeout condition may also be considered to be a rejection of the call with no cause (e.g., a silent rejection). After operation 308, the process 300 ends.

Figure 4:
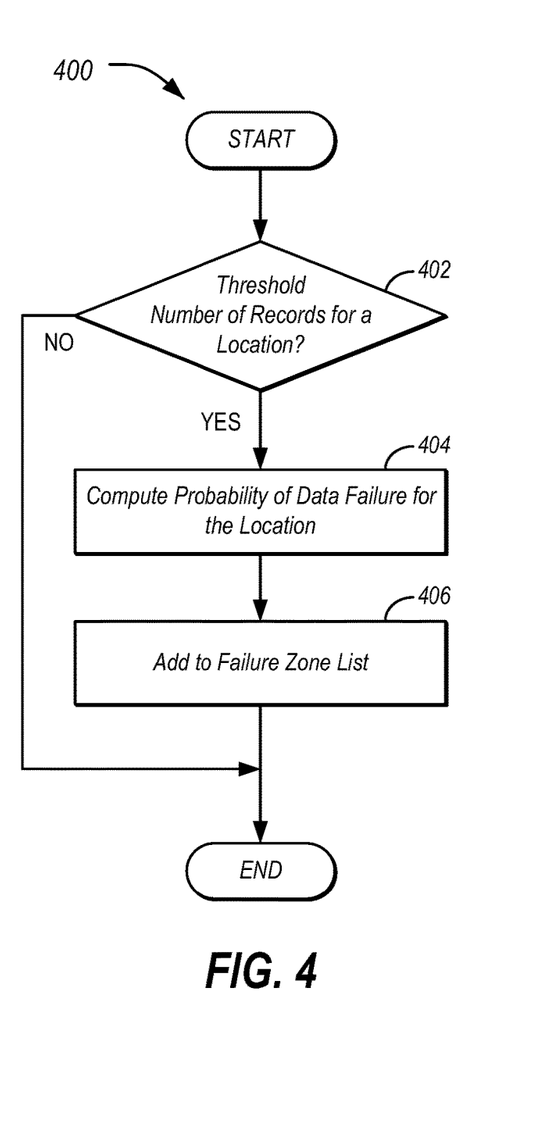
FIG. 4 illustrates an example process for building a failure zone list based on statistics of past data call attempts.

FIG. 4 illustrates an example process 400 for building a failure zone 120 list based on statistics of past data call attempts. Responsive to the TCU 108 attempting a subsequent data call within an existing failure zone 120 created according to the process 300, the TCU 108 may analyze the connection result, either success or failure cases, and update the parameters in the failure zone 120 record. In an example, the process 400 may be continuously performed by the TCU 108 of the vehicle 102 based on the records that are updated via the process 300.

At operation 402, the TCU 108 identifies whether a number of results being collected for a failure zone 120 reaches a predefined threshold N (e.g., a sufficiently large enough sample set is collected). If so, control passes to operation 404. Otherwise, the process 400 ends.

The TCU 108 computes a probability of data failure for the location at 404. The failure probability of a failure zone 120 may be computed in various ways including, but not limited to: (i) the number of failed data calls vs. number of total data calls, or (ii) the number of consistently failed data calls. The failure probability may be updated dynamically by the TCU 108 performing the data calls when it is in use. As long as the failure probability of a failure zone 120 exceeds a threshold F (e.g., a maximum number of failures that are allowed), the zone may be considered as an area that has low chance of success, and therefore should be added to the failure zone 120 list.

At 406, the area is added to the failure zone 120 list. It should be noted that the failure zone 120 may be uploaded to a remote service, such as to a service delivery network (SDN) and may also be downloaded from the SDN. In this way, the vehicles 102 may be able to share information regarding failure zones 120. After operation 406, the process 400 ends.

Figure 5:
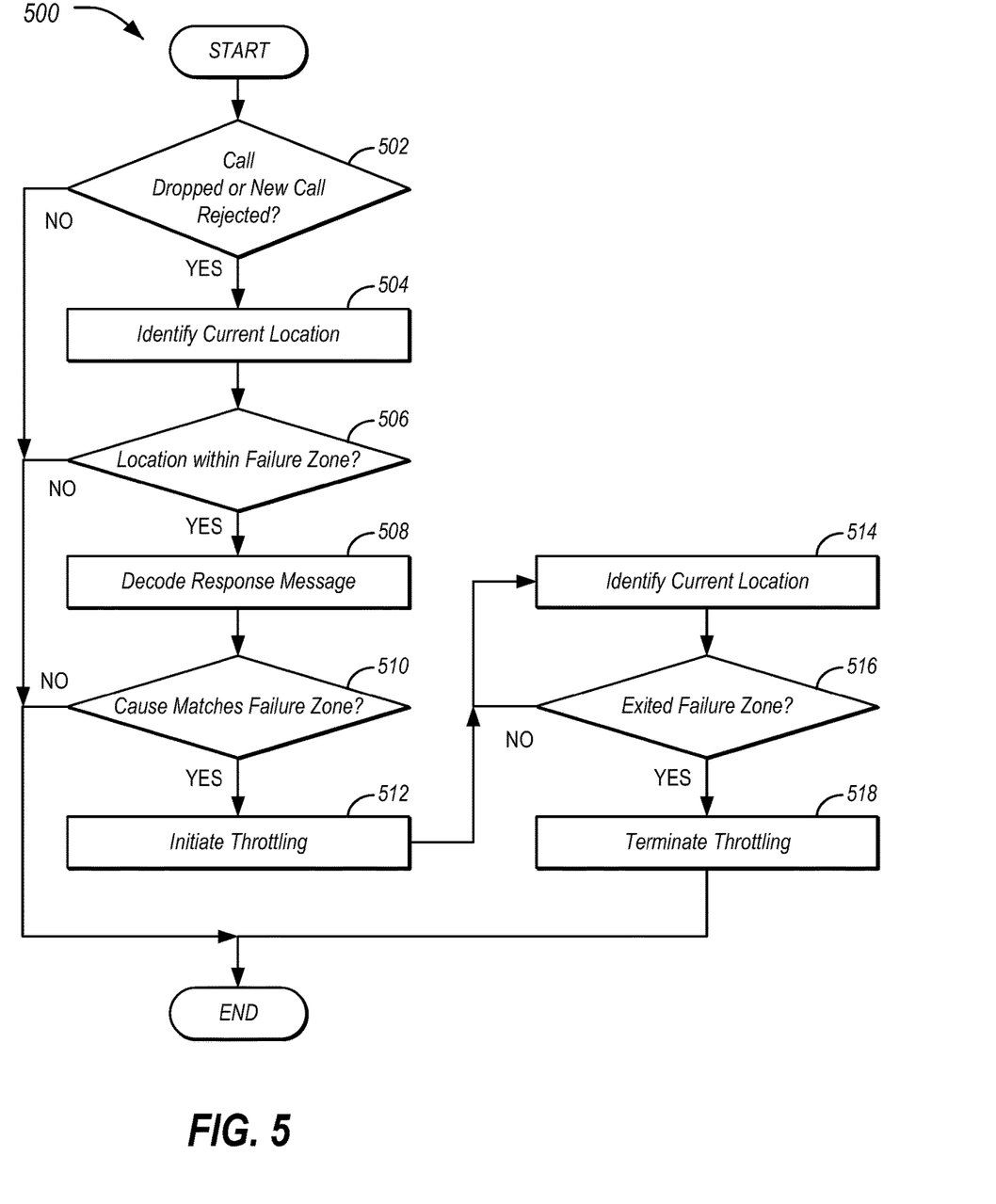
FIG. 5 illustrates an example process for throttling data retry in failure zones.

FIG. 5 illustrates an example process 500 for throttling data retry in failure zones 120. As with the processes 300 and 400, the process 500 may also be performed by the TCU 108.

At operation 502, the TCU 108 determines whether an existing data connection is being dropped or a new data call is being rejected. If so, control passes to operation 504 to identify the current location of the vehicle 102. In an example, the TCU 108 may retrieve the current location of the vehicle 102 over the vehicle bus 106 from the GNSS controller 104-F.

The TCU 108 identifies whether the vehicle 102 is located within a failure zone 120 at operation 506. In an example, the failure zones 120 may be those identified using the processes 300 and 400. If the current location of the vehicle 102 is within the predefined distance D, then control passes to operation 508.

At 508, the TCU 108 decodes the response message from the network 114. At operation 510, the TCU 108 compares the reject cause code against the one in the record of the failure zone 120 for the location. If the reject causes match, control passes to operation 512 for the TCU 108 to perform data throttling. The data throttling may be implemented in varies ways, including but not limited to the following: (i) performing a less aggressive data retry algorithm; or (ii) blocking any subsequent data retries.

At operation 514, the TCU 108 again identifies the current location of the vehicle 102 if the ignition is ON, e.g., via the GNSS controller 104-F. At 516, the TCU 108 determines whether the vehicle 102 has exited the failure zone 120. If the vehicle 102 remains within the failure zone 120, control returns to operation 514 to again check the vehicle 102 location. If the vehicle 102 has left the failure zone 120, control passes to operation 518 to terminate the throttling that was initiated at operation 512. After operation 518, the process 500 ends.

The connection-history-based retry throttling approach may also be further enhanced by monitoring the motion state of the device. For example, the throttling method can be applied to the vehicle 102 when the vehicle 102 is in an idle state only. Or, if the vehicle 102 is moving but the failure zone area is large then the throttling method can be applied to the vehicle 102. Thus, connection-history-based retry throttling may be disabled if the vehicle 102 is in driving state, as the vehicle 102 is likely to move out of the failure zone 120 quickly.

In general, computing systems and/or devices, such as the controllers 104 and TCU 108, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the controllers 104 and TCU 108, generally include computer-executable instructions that may be executable by one or more processors of the computing devices. Computer-executable instructions, such as those of the retry logic 122, may be compiled or interpreted from computer programs created using a variety of programming languages and/or technologies, including, without limitation, and either alone or in combination, JAVA™, C, C++, VISUAL BASIC, JAVA SCRIPT, PERL, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the controllers 104 and TCU 108 may be such computer program products (e.g., the retry logic 122, etc.). In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a telematics controller programmed to
create a failure zone within a cellular tower region responsive to a failure probability for locations within a geographic boundary of the failure zone exceeding a threshold maximum number of failures,
identify a location responsive to detecting a failed data call from the vehicle, and
if the location is within the geographic boundary of the failure zone within a cellular tower region and a cause of the failure matches a recorded cause for the failure zone, initiate data throttling until the vehicle moves outside of the geographic boundary.

2. The vehicle of claim 1, wherein the location is identified using a global navigation satellite system controller.

3. The vehicle of claim 1, wherein the controller is further programmed to perform the data throttling by utilizing a less-aggressive data retry algorithm than used when data throttling is not engaged.

4. The vehicle of claim 1, wherein the controller is further programmed to perform the data throttling by performing a blocking of subsequent data retries until data throttling is disengaged.

5. The vehicle of claim 1, wherein the controller is further programmed to identify a timeout as a cause of failure with no reason.

6. The vehicle of claim 1, wherein the geographic boundary of the failure zone is defined as a location point of a detected failure with a distance bound surrounding that point.

7. The vehicle of claim 1, wherein the controller is further programmed to:
upload a list of failure zones including the created failure zone to a remote server; and
download a list of failure zones from a remote server to obtain a list of crowd-sourced failure zones.

8. The vehicle of claim 1, wherein the controller is further programmed to compute the failure probability as a number of failed data calls within the geographic boundary compared to a total number of data calls for the geographic boundary.

9. The vehicle of claim 1, wherein the controller is further programmed to compute the failure probability as a number of consistently failed data calls within the geographic boundary.

10. The vehicle of claim 1, wherein the controller is further programmed to:
responsive to a data call being rejected, create a rejection record including the location and the cause for the rejection; and compute the failure probability based on the rejection records.

11. The vehicle of claim 1, wherein the failed data call is a dropped call, a rejected call, or a timed-out call.

12. A method comprising:
   creating a failure zone within a cellular tower region responsive to a failure probability for locations within a geographic boundary of the failure zone exceeding a threshold maximum number of failures;
   initiating data throttling for data calls from a vehicle responsive to a failure of a data call from the vehicle occurring within the geographic boundary of the failure zone within the cellular tower region and for a failure cause consistent with a clause specified by the failure zone; and
   terminating the data throttling responsive to the vehicle exiting the geographic boundary.

13. The method of claim 12, further comprising determining a location of the vehicle using a global navigation satellite system.

14. The method of claim 12, further comprising performing the data throttling by utilizing a less-aggressive data retry algorithm than used when data throttling is not engaged.

15. The method of claim 12, further comprising performing the data throttling by blocking of subsequent data retries until data throttling is disengaged.

16. A non-transitory computer-readable medium comprising instructions that, when executed by a processor of a telematics controller of a vehicle, cause the controller to:
   create a failure zone within a cellular tower region responsive to a failure probability for locations within a geographic boundary of the failure zone exceeding a threshold maximum number of failures;
   initiate data throttling for data calls from a vehicle responsive to a failure of a data call from the vehicle occurring within the geographic boundary of the failure zone within the cellular tower region and for a failure cause consistent with a clause specified by the failure zone; and
   terminate the data throttling responsive to the vehicle exiting the geographic boundary.

17. The medium of claim 16, further comprising instructions that, when executed by the processor, cause the controller to determine a location of the vehicle using a global navigation satellite system.

18. The medium of claim 16, further comprising instructions that, when executed by the processor, cause the controller to perform the data throttling by utilizing a less-aggressive data retry algorithm than used when data throttling is not engaged.

19. The medium of claim 16, further comprising instructions that, when executed by the processor, cause the controller to perform the data throttling by blocking of subsequent data retries until data throttling is disengaged.

20. The method of claim 12, further comprising:
   uploading a list of failure zones including the created failure zone to a remote server; and
   downloading a list of failure zones from a remote server to obtain a list of crowd-sourced failure zones.

21. The method of claim 12, further comprising computing the failure probability as a number of failed data calls within the geographic boundary compared to a total number of data calls for the geographic boundary.

22. The method of claim 12, further comprising computing the failure probability as a number of consistently failed data calls within the geographic boundary.

23. The method of claim 12, further comprising:
   responsive to a data call being rejected, creating a rejection record including the location and the cause for the rejection; and
   computing the failure probability based on the rejection records.

24. The medium of claim 16, further comprising instructions that, when executed by the processor, cause the controller to:
   upload a list of failure zones including the created failure zone to a remote server; and
   download a list of failure zones from a remote server to obtain a list of crowd-sourced failure zones.

25. The medium of claim 16, further comprising instructions that, when executed by the processor, cause the controller to compute the failure probability as a number of failed data calls within the geographic boundary compared to a total number of data calls for the geographic boundary.

26. The medium of claim 16, further comprising instructions that, when executed by the processor, cause the controller to compute the failure probability as a number of consistently failed data calls within the geographic boundary.

27. The medium of claim 16, further comprising instructions that, when executed by the processor, cause the controller to:
   responsive to a data call being rejected, create a rejection record including the location and the cause for the rejection; and
   compute the failure probability based on the rejection records.

* * * * *